(12) United States Patent
Wang et al.

(10) Patent No.: US 11,616,645 B1
(45) Date of Patent: Mar. 28, 2023

(54) ENCRYPTED DATA TRANSMISSION IN OPTICAL- AND RADIO-ACCESS NETWORKS BASED ON QUANTUM KEY DISTRIBUTION

(71) Applicant: CABLE TELEVISION LABORATORIES, INC., Louisville, CO (US)

(72) Inventors: Jing Wang, Broomfield, CO (US); Bernardo Huberman, Palo Alto, CA (US); Luis Alberto Campos, Superior, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/671,090

(22) Filed: Feb. 14, 2022

Related U.S. Application Data

(63) Continuation of application No. 16/870,781, filed on May 8, 2020, now Pat. No. 11,251,947.
(Continued)

(51) Int. Cl.
*H04L 29/06* (2006.01)
*H04L 9/08* (2006.01)
(Continued)

(52) U.S. Cl.
CPC .......... *H04L 9/0855* (2013.01); *H04B 10/27* (2013.01); *H04L 9/0891* (2013.01); *H04L 9/14* (2013.01); *H04L 2209/80* (2013.01)

(58) Field of Classification Search
CPC ....... H04L 9/0855; H04L 9/0891; H04L 9/14; H04L 2209/80; H04B 10/27
See application file for complete search history.

(56) References Cited

U.S. PATENT DOCUMENTS

| | | |
|---|---|---|
| 7,620,182 B2 | 11/2009 | Berzanskis et al. |
| 7,929,690 B2 | 4/2011 | Gisin et al. |
| | (Continued) | |

FOREIGN PATENT DOCUMENTS

| | | | | |
|---|---|---|---|---|
| WO | WO-2004030270 A1 * | 4/2004 | ............. | H04B 10/70 |
| WO | WO-2009093036 A2 * | 7/2009 | ............. | H04L 9/0852 |
| WO | WO-2019132680 A1 * | 7/2019 | ................ | G06F 7/58 |

OTHER PUBLICATIONS

Hirota, Osamu, et al. "Quantum stream cipher based on optical communications." Quantum Communications and Quantum Imaging II. vol. 5551. SPIE, 2004. (Year: 2004).*
(Continued)

*Primary Examiner* — Shawnchoy Rahman
(74) *Attorney, Agent, or Firm* — Lathrop GPM LLP

(57) ABSTRACT

A first node of a network includes a quantum transmitter, a classical transceiver, and an initial-key generator that cooperate with a second node to transmit an initial key via the quantum transmitter. The first node includes a key-series generator that (i) encrypts a first unencrypted key of a series of unencrypted keys to generate a first encrypted key of a series of encrypted keys and (ii) encrypts each subsequent unencrypted key of the series of unencrypted keys with a preceding unencrypted key of the series of unencrypted keys to generate a subsequent encrypted key of the series of encrypted keys. The encrypted keys are transmitted to the second node. The first node includes one or both of a decryptor and an encryptor. The decryptor decrypts encrypted data using a last unencrypted key of the series of unencrypted keys. The encryptor encrypts unencrypted data using the last unencrypted key.

31 Claims, 7 Drawing Sheets

Related U.S. Application Data

(60) Provisional application No. 62/845,150, filed on May 8, 2019.

(51) Int. Cl.
  *H04L 9/14*  (2006.01)
  *H04B 10/27*  (2013.01)

(56) References Cited

U.S. PATENT DOCUMENTS

| | | | |
|---|---|---|---|
| 9,876,639 B2 | 1/2018 | Choi et al. | |
| 10,855,453 B1* | 12/2020 | Vakili | H04L 9/0844 |
| 2020/0059358 A1 | 2/2020 | Legré et al. | |
| 2020/0274701 A1* | 8/2020 | Yuan | H04L 9/3066 |

OTHER PUBLICATIONS

Yuen, Horace P. "KCQ: A new approach to quantum cryptography I. General principles and key generation." arXiv preprint quant-ph/0311061 (2003). (Year: 2003).*

* cited by examiner

ENCRYPTED DATA TRANSMISSION IN OPTICAL- AND RADIO-ACCESS NETWORKS BASED ON QUANTUM KEY DISTRIBUTION

CROSS-REFERENCE TO RELATED APPLICATIONS

This application is a continuation of U.S. patent application Ser. No. 16/870,781, filed May 8, 2020, which claims the benefit of priority from U.S. Provisional Patent Application No. 62/845,150, filed May 8, 2019. Each of these applications is incorporated herein by reference in its entirety.

BACKGROUND

The proliferation of smart mobile devices and video-intensive applications is driving the growth of mobile data traffic in an exponential way, making the last-mile access become the bottleneck of user experience. As the last segment of fiber-optic networks, optical- and radio-access networks have been widely deployed in the form of passive optical networks (PONs), radio-access networks (RANs), and hybrid fiber and coaxial (HFC) networks. Optical- and radio-access networks are the most vulnerable segment of data security, where most eavesdropping and cyber-attacks take place. For example, a PON utilizes a tree architecture and broadcasts the downstream signals to all optical node units (ONUs). Every ONU can eavesdrop the downstream traffic without being noticed. The eavesdropper can know the MAC addresses and logic link identifications of the neighbors and infer their traffic type and amount. The downstream multiple-point-control protocol messages also reveals the upstream traffic characteristics of neighbor ONUs. If there is reflection at the optical splitter or scattering in the feeder fiber, the eavesdropper can even access the upstream data of neighbors. Radio-access networks are even more susceptible to eavesdropping, since the wireless signals are publicly accessible to all users within a certain geographical area.

In modern days, most mobile devices access networks wirelessly via radio-access, such as Wi-Fi, LTE, and 5G. For example, a mobile device may access a PON or HFC network via Wi-Fi.

Data encryption provides protections to both service providers and users. In PON, it enables the operators to prevent unauthorized ONUs from gaining access to the networks. It also offers privacy to end users by preventing them from listening each other. This also applies to radio-access networks. Both asymmetric (public key) and symmetric (private key) cryptosystems have been implemented in optical- and radio-access networks. Due to their superior performance, symmetric cryptosystems, especially Advanced Encryption Standard (AES), have been most widely used. For example, XG-PON uses AES counter mode (AES-CTR) algorithm to encrypt data blocks of 128 bits with a cipher key of 128, 192 or 256 bits. Wi-Fi protected access (WPA) uses a preshared key and temporal key integrity protocol (TKIP) for encryption. In 2004, WPA2 added support to AES. For 4G-LTE, there are three cryptographic algorithms to protect the air interface between the user equipment (UE) and eNodeB (eNB), SNOW 3G (stream cipher designed by Lund University, Sweden), AES, and ZUC (stream cipher designed by China Academy of Sciences), all based on symmetric cryptosystems. Finally, in HFC networks, DOC SIS 1.0 and 2.0 specifications use baseline privacy interface (BPI) and BPI+ based on 56-bit data encryption standard DES), then DOCSIS 3.0 and 3.1 specifications added support to 128-bit AES. In OSI or TCP/IP models, encryption can happen in various layers of the network, such as MAC layer security (MACsec), IP layer security (IPsec), secure sockets layer (SSL), and transport layer security (TLS).

The security of all these encryption algorithms depends on the confidentiality and integrity of the pre-shared initial key. The initial key is often distributed over a public channel. For example, in TLS, one party "Bob" has a private key. Based on this private key, Bob computes a public key and broadcasts it to all interested parties. Another party "Alice" receives the public key, encrypts a random number with the public key and sends the result to Bob. Since only Bob has the private key, only he can decrypt this number. Now both parties have identical copies of the random number and they can use it as the initial key for subsequent data encryption.

SUMMARY

The overall security of symmetric cryptosystems depends on the confidentiality (unavailable to an eavesdropper) and integrity (not subject to modification by an eavesdropper) of the pre-shared initial key. In conventional systems, without quantum key distribution, the initial key is often delivered by a public-key protocol. The security of this public-key protocol is, at best, based on the computational complexity of an eavesdropper's calculation of the initial key from the public-key transmission. However, the advent of quantum computers, with unprecedented computation power, poses a significant threat against security based merely on computational complexity. For example, Shor's algorithm on a quantum computer can break RSA (Rivest-Shamir-Adleman) systems, often used in transport layer security, in polynomial time by solving the large integer factorization problem.

The present invention removes this vulnerability of optical- and radio-access networks to eavesdropping and cyber-attacks by sharing the initial key via quantum key distribution (QKD). QKD transmits a series of quantum bits ("qubits"), and the security of this transmission is guaranteed by quantum physics. Quantum physics renders it impossible to secretly eavesdrop QKD, as eavesdropping is a destructive measurement that causes a detectable change to the transmitted qubits.

In an embodiment, a method for quantum-key-distribution-based encrypted data transmission in an optical/radio-access network, having a plurality of end nodes, includes performing the following steps at a first node of the network: (1) Via an optical quantum channel, exchange a plurality of photonic qubits with a second node of the network, wherein the plurality of photonic qubits are processable to derive therefrom an initial key such that each of the first and second nodes have a copy of the initial key. (2) Via a classical channel, exchange a series of encrypted keys with the second node, wherein a first encrypted key in the series of encrypted keys is encrypted by the initial key, and each subsequent encrypted key in the series of encrypted keys is encrypted by a preceding encrypted key in the series of encrypted keys. (3) Via the classical channel, exchange encrypted data with the second node, wherein the encrypted data is encrypted by a last encrypted key in the series of encrypted keys. One, but not both, of the first and second nodes is one of the plurality of end nodes.

In an embodiment, a quantum-reception-enabled system for quantum-key-distribution-based encrypted data transmission in an optical/radio-access network, having a plurality of end nodes, includes (a) an optical quantum receiver for measuring a plurality of photonic qubits processable to derive therefrom an initial key, (b) a classical receiver for receiving an input signal having classical input data encoded therein, and (c) a classical transmitter for transmitting an output signal having classical output data encoded therein.

In an embodiment, a quantum-transmission-enabled system for quantum-key-distribution-based encrypted data transmission in an optical/radio-access network, having a plurality of end nodes, includes (a) an optical quantum transmitter configured to transmit a plurality of photonic qubits processable to derive therefrom an initial key, (b) a classical transmitter configured to transmit an optical- or radio-signal having classical output data encoded therein, and (c) a classical receiver configured to receiving an optical- or radio-signal having classical input data encoded therein.

DETAILED DESCRIPTION

Figure 1:
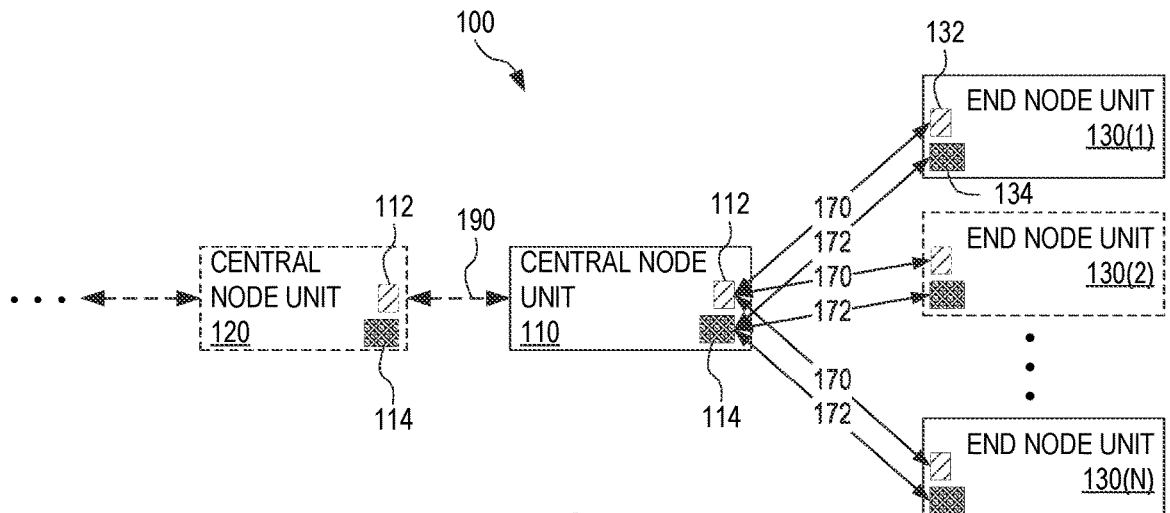
FIG. 1 illustrates an optical/radio-access network configured for encrypted data transmission based on quantum key distribution (QKD) of an initial key, according to an embodiment.

FIG. 1 illustrates one optical/radio-access network 100 configured for encrypted data transmission based on quantum key distribution (QKD) of an initial key. Network 100 includes a central node unit 110 communicatively coupled with two or more end node units 130. Central node unit 110 includes a quantum communication device 112 and a classical transceiver 114. Each end node unit 130 includes a quantum communication device 132 and a classical transceiver 134. Network 100 forms both an optical quantum channel 170 and a classical channel 172 between central node unit 110 and each end node unit 130. More specifically, quantum communication device 132 of each end node unit 130 is communicatively coupled with quantum communication device 112 of central node unit 110 via a respective optical quantum channel 170, and classical transceiver 134 of each end node unit 130 is communicatively coupled with classical transceiver 114 of central node unit 110 via a respective classical channel 172. Each classical channel 172 is a two-way optical- or radio-communication channel.

Herein, an "optical/radio-access network" refers to a network that utilizes optical access, radio access, or a combination of optical access and radio access to connect a plurality of end nodes to the same network. Network 100 is, for example, a passive optical network (PON), radio-access network (RAN), or hybrid fiber and coaxial (HFC) network.

By virtue of the link between each end node unit 130 and central node unit 110 including optical quantum channel 170, network 100 is capable of secure, encrypted data transmission between central node unit 110 and any particular one of end node units 130 based on QKD of an initial key between central node unit 110 and the particular end node unit 130. Subsequent data transmission via classical channel 172 between classical transceiver 114 and classical transceiver 134 of the particular end node unit 130 may then be encrypted based on this securely transmitted initial key.

QKD secures the sharing of the initial key against eavesdropping by other ones of end node units 130 as well as by other intruders. In network 100, QKD is based on the transmission of photonic qubits. In embodiments where network 100 relies on radio-access, communication between central node unit 110 and end note units 130 is via wireless radio-frequency transmission (e.g., 5G, LTE, and even Wi-Fi) that is particularly susceptible to eavesdropping. However, quantum physics prevents such eavesdropping from being undetectable, and radio-access-based embodiments of network 100 therefore provides QKD-based secure data transmission. In embodiments where network 100 is an optical access network, different network architectures may have different weaknesses allowing eavesdropping. For example, in a PON embodiment of network 100, any classical signal transmitted by central node unit 110 and intended for a particular one of end node units 130 is also transmitted to all other end node units 130. Even optical-access-based architectures configured for classical transmission from central node unit 110 to a particular end node unit 130 in an isolated fashion are susceptible to eavesdropping, for example via reflected optical signals. Again, quantum physics prevents such eavesdropping from being undetectable, and optical-access-based embodiments of network 100 therefore provides QKD-based secure data transmission.

In a "downstream quantum transmission" embodiment of network 100, each optical quantum channel 170 is a one-way communication channel configured for transmission of photonic qubits from central node unit 110 to the respective end node unit 130. In this embodiment, quantum communication device 112 is a photonic transmitter configured to transmit photonic qubits (e.g., a weak laser light source capable of transmitting a series of single-photon pulses), and each quantum communication device 132 is a quantum receiver configured to measure the photonic qubits. In an "upstream quantum transmission" embodiment of network 100, each optical quantum channel 170 is a one-way communication channel configured for transmission of photonic qubits from the respective end node unit 130 to central node unit 110. In this embodiment, each quantum communication device 132 is a photonic transmitter configured to transmit photonic qubits (e.g., a weak laser light source capable of transmitting a series of single-photon pulses), and quantum communication device 112 is a quantum receiver configured to measure the photonic qubits. In a "two-way quantum transmission" embodiment of network 100, each optical quantum channel 170 is a two-way communication channel configured for transmission of photonic qubits from the respective end node unit 130 to central node unit 110 as well as from central node unit 110 to the respective end node unit 130. In this embodiment, each quantum communication device 132 and also quantum communication device 112 includes both a photonic transmitter and a quantum receiver as discussed above.

In each of the downstream, upstream, and two-way quantum transmission embodiments, each quantum receiver may include a single-photon detector for detection of single-photon pulses. A single-photon detector is generally more expensive than a weak laser light source, and the upstream quantum transmission embodiment of network 100 may therefore be more cost-effective than the downstream and two-way quantum transmission embodiments, especially from the perspective of end users associated with end node units 130.

Network 100 may include additional central node units, such as central node unit 120 depicted in FIG. 1, upstream of central node unit 110. Herein, an "end node unit" refers to a unit located on one branch of a plurality of branches of a network propagating downstream from a branching point of the network, and a "central node unit" generally refers to a unit located at a node that is either at the branching point (as in the case of central node unit 110) or upstream from the branching point (as in the case of central node unit(s) 120). In embodiments of network 100 having two of more central node units, these central units may be serially connected to each other. It is understood that the branching structure may be more complex than in FIG. 1.

Without departing from the scope hereof, quantum communication device 112 and classical transceiver 114 may be incorporated in a central node unit 120 upstream of central node unit 110 instead of being incorporated in central node unit 110. In such embodiments, each optical quantum channel 170 and each classical channel 172 extends between the respective end node unit 130 and central node unit 120 via central node unit 110.

Figure 2:
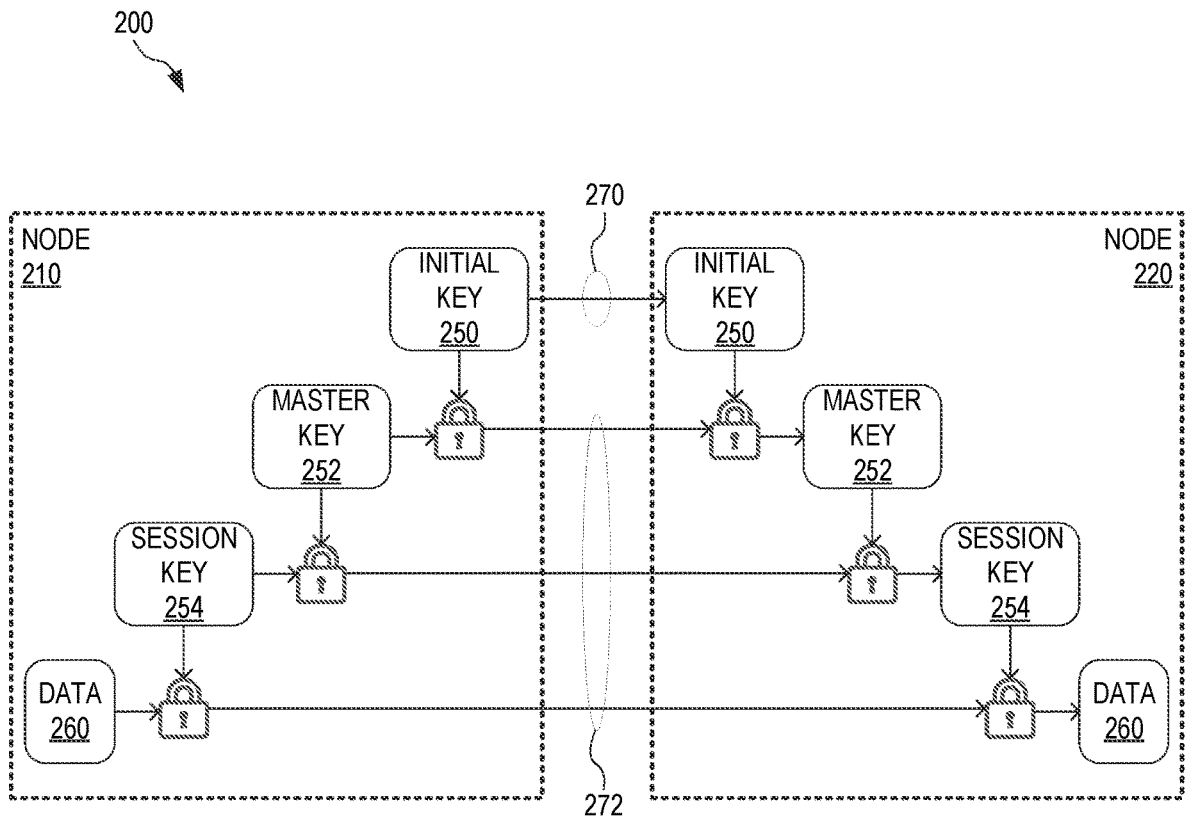
FIG. 2 illustrates an encryption protocol for encrypted transmission of data in an optical/radio-access network based on QKD of an initial key, according to an embodiment.

FIG. 2 illustrates one encryption protocol 200 for encrypted transmission of data 260 in an optical/radio-access network based on QKD of an initial key. Network 100 may implement encryption protocol 200. Two nodes 210 and 220 of a network collaborate to perform encryption protocol 200. In one example, node 210 is the node of one of (a) central node unit 110 or 120 and (b) a single end node unit 130, and node 220 is the node of the other one of (a) central node unit 110 or 120 and (b) a single end node unit 130. In protocol 200, node 210 distributes, via QKD and an optical quantum channel 270, an initial key 250 to node 220. Protocol 200 may utilize a QKD protocol known in the art, for example as discussed below in reference to FIG. 12. Examples of suitable QKD protocols include BB84, E91, entangled photon pair, and measurement-device-independent twin-field QKD. Optical quantum channel 270 is, for example, optical quantum channel 170. Next, node 210 uses initial key 250 to encrypt a master key 252 and communicates the encrypted master key 252 to node 220 via a classical channel 272 (e.g., classical channel 172), whereafter node 220 uses initial key 250 to decrypt the encrypted master key 252. Next, node 210 uses master key 252 to encrypt a session key 254 and communicates the encrypted session key 254 to node 220 via a classical channel 272, whereafter node 220 uses master key 252 to decrypt the encrypted session key 254. Finally, node 210 uses session key 254 to encrypt data 260 and communicates encrypted data 260 to node 220 via a classical channel 272, whereafter node 220 uses session key 254 to decrypt the encrypted data 260.

Without departing from the scope hereof, the roles of nodes 210 and 220 may be interchanged for one or more of master key 252, session key 254, and data 260. Node 220 may be the initiator for one, two, or all of master key 252, session key 254, and data 260. Furthermore, protocol 200 allows for (a) the same initial key 250 being used to encrypt and decrypt several master keys 252, (b) the same master key 252 being used to encrypt and decrypt several session keys 254, and (c) the same session key 254 being used to encrypt and decrypt several instances of data 260, wherein each transmission of master key 252, session key 254, and data 260 may be initiated by either one of node 210 and node 220.

Master key 252 and session key 254 are examples of serially generated encrypted keys. More generally, protocol 200 includes the use of two of more serially generated encrypted keys. For example, when used in 4G-LTE networks, protocol 200 may use at least four serially generated encrypted keys (e.g., root key, CK, IK, and IK-ASME).

The execution of protocol 200 may be controlled by a MAC-layer of the network.

Figure 3:
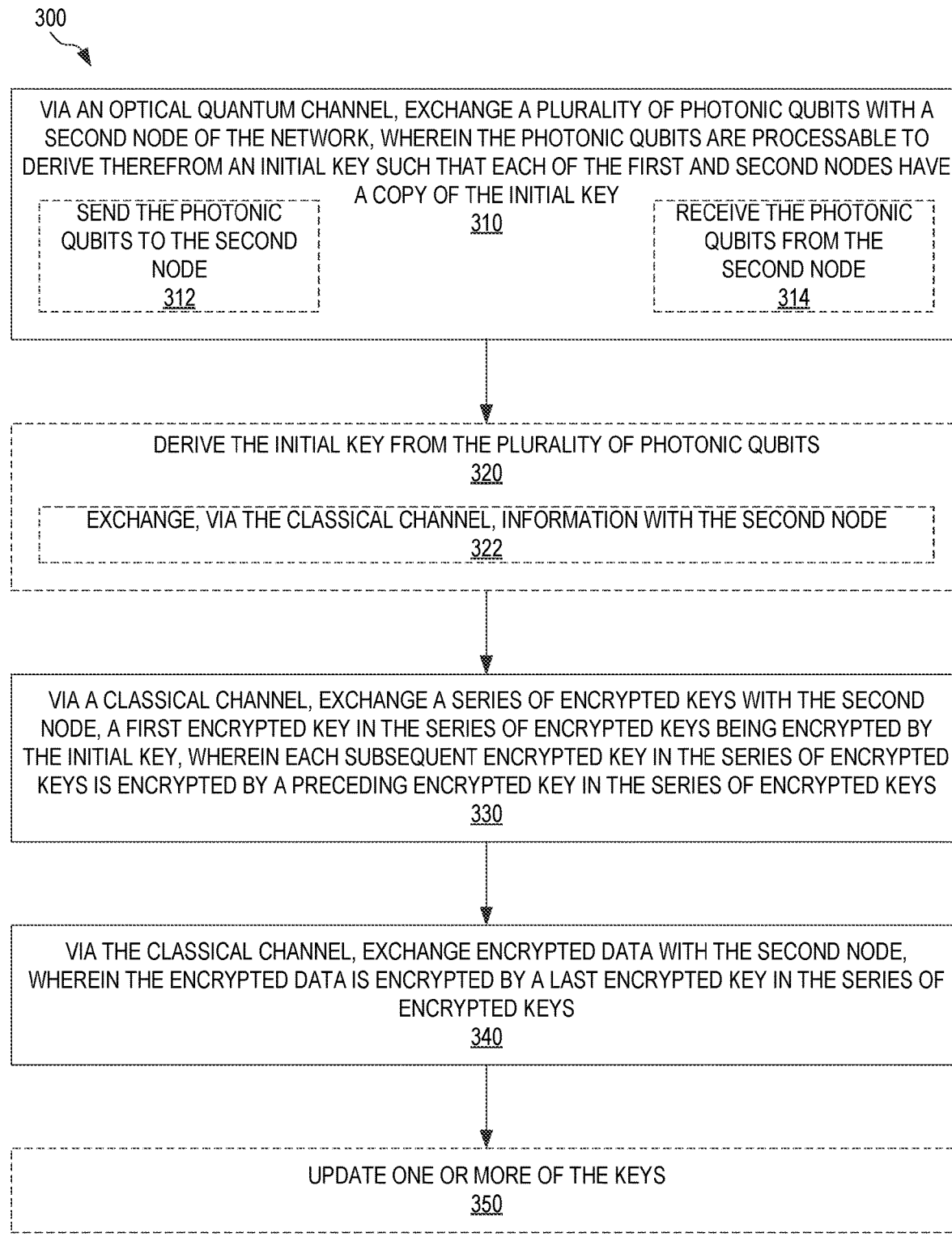
FIG. 3 illustrates a method for QKD-based encrypted data transmission in an optical/radio-access network having a plurality of end nodes, according to an embodiment.

FIG. 3 illustrates one method 300 for QKD-based encrypted data transmission in an optical/radio-access network having a plurality of end nodes. Method 300 may be implemented in network 100. Method 300 is performed at a first node of a network and includes performing either the portion of protocol 200 taking place at node 210 or the portion of protocol 200 taking place at node 220. In one scenario, method 300 is performed by an end node unit 130. In another scenario, method 300 is performed by central node unit 110 or 120. Method 300 includes steps 310, 330, and 340.

Via an optical quantum channel, step 310 exchanges a plurality of photonic qubits with a second node of the network. The plurality of qubits are processable, according to a QKD protocol, to derive therefrom an initial key (e.g., initial key 250), such that each of the first and second nodes have a copy of the initial key. Step 310 includes either step 312 or step 314. Step 312 sends the photonic qubits to the second node. Step 314 receives the photonic qubits from the second node. In one example of step 310, implementing step 312, quantum communication device 132 of end node unit 130 sends the plurality of photonic qubits via optical quantum channel 170 to quantum communication device 112 of central node unit 110 (or 120), or vice versa. In one example of step 310, implementing step 314, quantum communication device 132 of end node unit 130 receives the plurality of photonic qubits via optical quantum channel 170 from quantum communication device 112 of central node unit 110 (or 120), or vice versa.

Via a classical channel, step 330 exchanges a series of encrypted keys (e.g., master key 252 and session key 254) with the second node. A first encrypted key in the series of encrypted keys is encrypted by the initial key, and each subsequent encrypted key in the series of encrypted keys is encrypted by a preceding encrypted key in the series of encrypted keys, as discussed above in reference to FIG. 2. For each of the encrypted keys, step 330 may either send or receive the encrypted key. When step 330 sends the encrypted key, step 330 may first encrypt the encrypted key according to protocol 200. When step 330 receives the encrypted key, step 330 may decrypt the encrypted key according to protocol 200. In one example of step 330, pertaining to any one of the encrypted keys, classical transceiver 134 of end node unit 130 sends the encrypted key (e.g., encrypted master key 252) to classical transceiver 114 of central node unit 110 (or 120) via classical channel 172. This example of step 330 may include end node unit 130 encrypting the key. In another example of step 330, pertaining to any one of the encrypted keys, classical transceiver 134 of end node unit 130 receives the encrypted key (e.g., encrypted master key 252) from classical transceiver 114 of central node unit 110 (or 120) via classical channel 172. This example of step 330 may include end node unit 130 decrypting the encrypted master key 252. Similar examples of step 330 may be performed with the roles of end node unit 130 and central node unit 110 (or 120) interchanged.

Via the classical channel, step 340 exchanges encrypted data with the second node. The encrypted data is encrypted by a last encrypted key in the series of encrypted keys (such as session key 254) according to protocol 200. In one example of step 340, classical transceiver 134 of end node unit 130 sends the encrypted data (e.g., encrypted data 260) to classical transceiver 114 of central node unit 110 (or 120) via classical channel 172. This example of step 340 may include end node unit 130 encrypting the data. In another example of step 340, classical transceiver 134 of end node unit 130 receives the encrypted data (e.g., encrypted data 260) from classical transceiver 114 of central node unit 110 (or 120) via classical channel 172. This example of step 340 may include end node unit 130 decrypting the encrypted data 260. Similar examples of step 340 may be performed with the roles of end node unit 130 and central node unit 110 (or 120) interchanged.

In certain embodiments, method 300 further includes a step 320, performed between steps 310 and 330. Step 320 derives the initial key from the plurality of photonic qubits, according to a QKD protocol. Step 320 may include exchanging information with the second node via the classical channel, in order to derive the initial key from the exchanged qubits. In one example of step 320, quantum communication device 132 of end node unit 130 measures a plurality of photonic qubits received from central node unit 110 (or 120) to derive initial key 250 from the photonic qubits. In this example, end node unit 130 may further exchange classical information with central node unit 110 (or 120) via classical channel 172 to aid the derivation of initial key 250 from the received photonic qubits. For example, end node unit 130 and central node unit 110 (or 120) may work together to determine if the integrity of the photonic qubits was compromised during transmission, a sign of eavesdropping, and only retain, as the initial key, a series of photonic qubits deemed undisturbed. In another example of step 320, quantum communication device 132 of end node unit 130 sends a plurality of photonic qubits to central node unit 110 (or 120). The photonic qubits encode initial key 250 in at least some of the transmitted photonic qubits. This example of step 320 may include end node unit 130 exchanging classical information with central node unit 110 (or 120) via classical channel 172 to aid the establishment of initial key 250 as a portion of the transmitted photonic qubits deemed undisturbed during transmission. Similar examples of step 320 may be performed with the roles of end node unit 130 and central node unit 110 (or 120) interchanged.

Method 300 may further include a step 350 of updating the initial key and/or one or more of the encrypted keys by repeating one or more of steps 310 and 330 (and optionally also step 320. For example, method 300 may be configured to update the initial key and each of the encrypted keys according to a predefined schedule, wherein the initial key is least frequently updated, first encrypted key is updated more frequently than the initial key, and each subsequent encrypted key is updated more frequently than the preceding encrypted key.

The execution of method 300 may be controlled by a MAC-layer of the network.

Without departing from the scope hereof, method 300 may perform several repetitions of step 310 and step 320 before proceeding to step 330, so as to build a library of initial keys.

Figure 4:
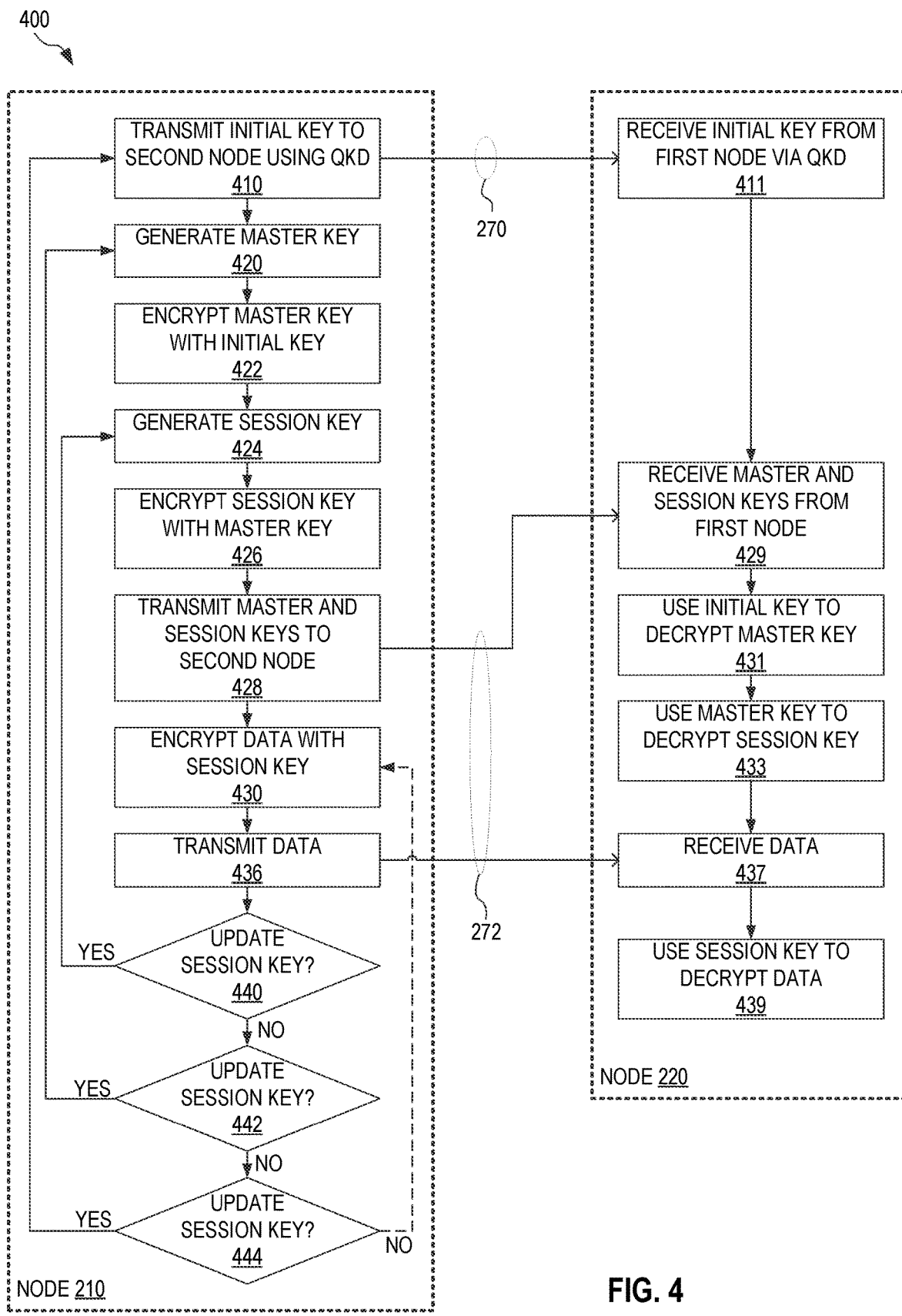
FIG. 4 illustrates another encryption protocol for encrypted transmission of data in an optical/radio-access network based on QKD of an initial key, according to an embodiment.

FIG. 4 illustrates another encryption protocol 400 for encrypted transmission of data 260 in an optical/radio-access network based on QKD of an initial key. Protocol 400 is an embodiment of protocol 200 that includes generation and updates of keys. Network 100 may implement encryption protocol 400.

A step 410 transmits an initial key from node 210 via optical quantum channel 270. A step 411 receives the initial key at node 220. Steps 410 and 411 collaborate according to a QKD protocol to establish the initial key, e.g., initial key 250, from transmitted photonic qubits. Each of steps 410 and 411 is an example of step 310 of method 300.

A step 420, performed at node 210, generates a master key, e.g., master key 252, which is encrypted by the initial key in a step 422. A step 424, also performed at node 210, generates a session key, e.g., session key 254, which is encrypted by the master key in a step 426. A step 428 transmits the master and session keys from node 210 via classical channel 272. A step 429 receives the master and session keys at node 220. A step 431, performed at node 220, uses the initial key to decrypt the master key. A step 433, also performed at node 220, uses the master key to decrypt the session key. Steps 420, 422, 424, and 426 together form one example of step 330 of method 300. Steps 429, 431, and 433 together form another example of step 330 of method 300. Without departing from the scope hereof, steps 420, 422, 424, and 426 may instead be performed at node 220, and steps 429, 431, and 433 may instead be performed at node 210.

A step 430, performed at node 210, encrypts data with the session key. A step 436 transmits the encrypted data from node 210. A step 437 receives that encrypted data at node 220. A step 437, performed at node 220, decrypts the encrypted data with the session key. Steps 430 and 436 together form one example of step 340 of method 300. Steps 437 and 439 together form another example of step 340 of method 300. Without departing from the scope hereof, steps 430 and 436 may instead be performed at node 220, and steps 437 and 439 may instead be performed at node 210.

After step 436, protocol 400 proceeds to step a decision step 440. Step 440 determines, for example based on a predefined schedule, if the session key needs to be updated. If so, protocol 400 returns to step 424. If not, protocol 400 proceeds to a decision step 442. Step 442 determines, for example based on a predefined schedule, if the master key needs to be updated. If so, protocol 400 returns to step 420.

If not, protocol 400 proceeds to a decision step 444. Step 444 determines, for example based on a predefined schedule, if the initial key needs to be updated. If so, protocol 400 returns to step 410. If not, protocol 400 may return to step 430 to initiate another encrypted data transmission. Although shown in FIG. 4 as being performed at node 210, decision steps 440, 442, and 444 may instead be performed at node 220, or each of nodes 210 and 220 may be configured to perform steps 440, 442, and 444.

As discussed above, nodes 210 and 220 collaborate to perform encryption protocol 400, with one portion of protocol 400 being performed at node 210 and another portion of protocol 400 being performed at node 220. Thus, referring now to FIGS. 3 and 4 in combination, one embodiment of method 300, implementing step 312, includes the portion of protocol 400 performed at node 210, and another embodiment of method 300, implementing step 314, includes the portion of protocol 400 performed at node 220.

As discussed above in reference to FIG. 2, master key 252 and session key 254 are only examples of serially generated encrypted keys. More generally, protocol 400 includes the use of two of more serially generated encrypted keys. For example, when used in 4G-LTE networks, protocol 400 may use at least four serially generated encrypted keys (e.g., root key, CK, IK, and IK-ASME).

The execution of protocol 400 may be controlled by a MAC-layer of the network.

Figure 5:
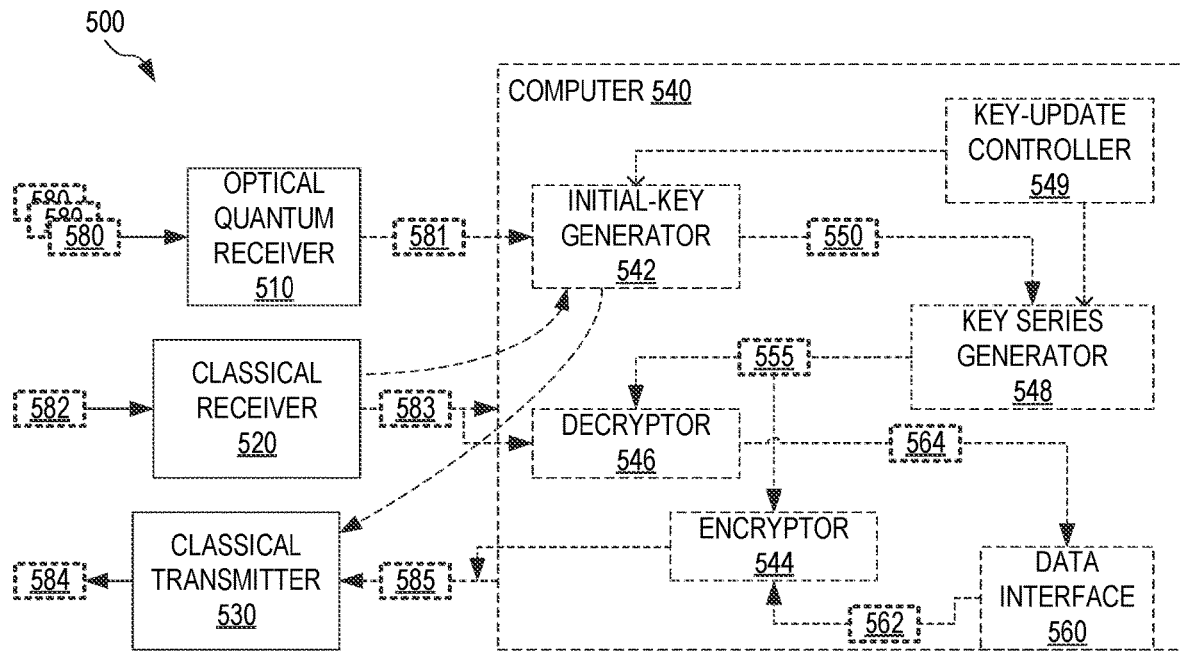
FIG. 5 illustrates a quantum-reception-enabled system for QKD-based encrypted data transmission in an optical/radio-access network having a plurality of end nodes, according to an embodiment.

FIG. 5 illustrates one quantum-reception-enabled system 500 for QKD-based encrypted data transmission in an optical/radio-access network having a plurality of end nodes. System 500 may be implemented in network 100 as an embodiment of either one of end node unit 130, central node unit 110, and central node unit 120. System 500 may be configured to perform certain embodiments of method 300 implementing step 312, for example according to protocol 200 or 400.

System 500 includes an optical quantum receiver 510, a classical receiver 520, and a classical transmitter 530. Optical quantum receiver 510 receives and measures a plurality of photonic qubits 580. Optical quantum receiver 510 may include a single-photon detector for detection of the photonic qubits. Optical quantum receiver 510 may perform step 314 of method 300, or a qubit-measurement portion of step 411 of protocol 400. Classical receiver 520 receives a classical signal 582. Classical receiver 520 may participate in the performance of steps 330 and 340 of method 300, or perform steps 429 and 437 of protocol 400. Classical transmitter 530 transmits a classical signal 584. Classical transmitter 530 may participate in the performance of steps 330 and 340 of method 300, or perform steps 428 and 436 of protocol 400.

In one embodiment of system 500, classical signals 582 and 584 are optical signals. In this embodiment, classical receiver 520 includes a photodetector for detection of classical signal 582, and classical transmitter 530 includes a laser light source for generation of classical signal 584. This embodiment of system 500 is suitable for implementation in an end node or central node of an optical access network, as well as in a central node of a radio-access network.

In another embodiment, classical signals 582 and 584 are radio-frequency (RF) signals. In this embodiment, classical receiver 520 includes an RF receiver for detection of classical signal 582, and classical transmitter 530 includes an RF transmitter for generation of classical signal 584. This embodiment of system 500 is suitable for implementation in an end node of a radio-access network, and at a central node at the branching point (e.g., in central node unit 110) of a radio-access network to a plurality of radio-access end nodes. This embodiment is also suitable for implementation at end nodes of any optical- and radio-access network (e.g., PON and HFC) where user devices connect to the end node via Wi-Fi, as well as suitable for implementation in such user devices.

System 500 may further include a computer 540. Computer 540 may be a classical computer. Computer 540 includes an initial-key generator 542, a key series generator 548, and at least one of a decryptor 546 and an encryptor 544. Initial-key generator 542 derives an initial key 550 (an example of initial key 250) from measurements 581 of photonic qubits 580, wherein measurements 581 are performed by optical quantum receiver 510. Initial-key generator 542 may be configured to perform a data-processing portion of step 310 according to a QKD protocol, for example as discussed below in reference to FIG. 12. Examples of suitable QKD protocols include BB84, E91, entangled photon pair, and measurement-device-independent twin-field QKD. Initial-key generator 542 may be configured to utilize classical receiver 520 and/or classical transmitter 530 to obtain and/or transmit classical data in the process of deriving initial key 550 from measurements 581.

Key series generator 548 generates a series of keys 555 based, in part, on initial key 550. Keys 555 are, for example, master key 252 and session key 254. In one embodiment, key series generator 548 is configured to perform steps 420, 422, 424, and 426 of protocol 400. In another embodiment, which may be combined with the preceding embodiment, key series generator 548 is configured to perform steps 429, 431, and 433 of protocol 400. In yet another embodiment, key series generator 548 is configured to perform either one of (a) steps 420, 422, 424, and 426 of protocol 400, and (b) steps 429, 431, and 433 of protocol 400.

Decryptor 546 uses a last one of keys 555 to decrypt encrypted data 583 obtained from classical signal 582 by classical receiver 520, so as to generate decrypted data 564. Data 583 may be data 260. Decryptor 546 may thus perform step 439 of protocol 400. Encryptor 544 uses a last one of keys 555 to encrypt data 562 to generate encrypted data 585 to be transmitted by classical transmitter 530 in the form of classical signal 584. Data 562 may be data 260. Encryptor 544 may thus perform step 430 of protocol 400. Although not shown in FIG. 5, key series generator 548 may utilize decryptor 546 and/or encryptor 544 to generate one or more of keys 555.

Computer 540 may further include a data interface 560 for obtaining data 562 and outputting decrypted data 564. In addition, computer 540 may include a key-update controller 549 that controls update of initial key 550 by initial-key generator 542 and update of any one of keys 555 by key series generator 548.

Figure 6:
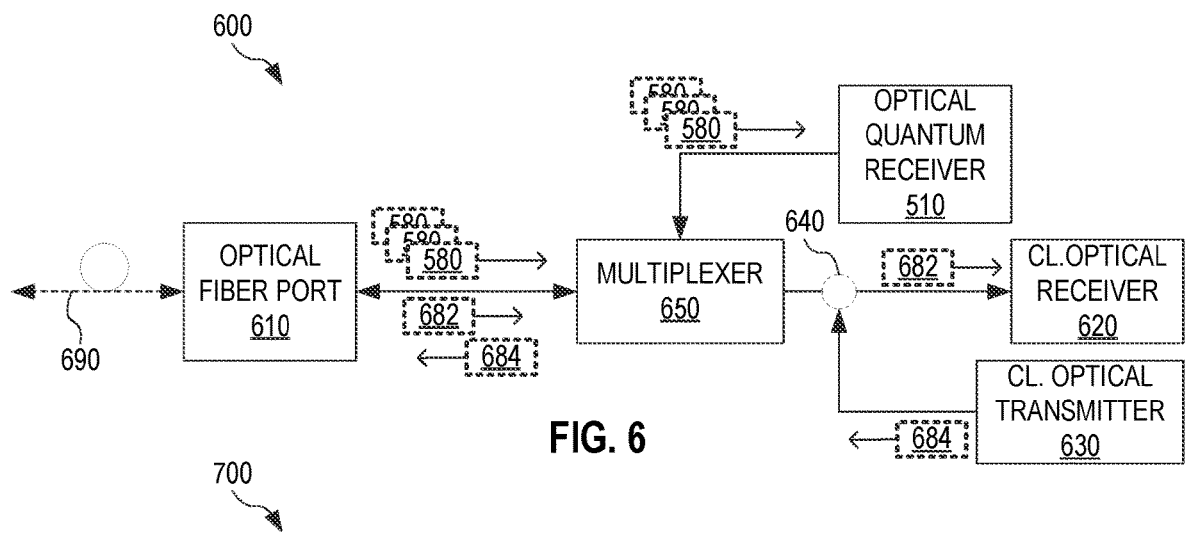
FIG. 6 illustrates a quantum-reception-enabled system for QKD-based encrypted optical data transmission, according to an embodiment.

FIG. 6 illustrates one quantum-reception-enabled system 600 for QKD-based encrypted optical data transmission. System 600 is an embodiment of system 500 specifically adapted for optical communication of classical signals and configured to utilize a shared optical fiber connection for both quantum and classical channel connections to an optical access network. System 600 includes optical quantum receiver 510, a classical optical receiver 620, a classical optical transmitter 630, a multiplexer 650, and an optical fiber port 610. Classical optical receiver 620 and transmitter 630 are embodiments of classical receiver 520 and transmitter 530, respectively.

System 600 receives photonic qubits 580 from optical fiber port 610 which, in operation, is coupled to an optical fiber 690 of the optical access network. System 600 also receives classical optical signals 682 from optical fiber port 610, and transmits classical optical signals 684 from optical fiber port 610. Classical optical signals 684 are generated by classical optical transmitter 630.

Multiplexer 650 temporally or spectrally multiplexes between (a) relaying photonic qubits 580 to optical quantum receiver 510 and (b) relaying classical optical signals 682 to classical optical receiver 620 and classical optical signals 684 from classical optical transmitter 630. Thus, multiplexer 650 temporally or spectrally multiplexes between using optical fiber 690 as a quantum channel and a classical channel. Multiplexer 650 may be a switch for temporal multiplexing, or a wavelength-division multiplexer that allocates one wavelength band to the quantum channel and another wavelength band to the classical channel. Temporal multiplexing may be advantageous, as compared to spectral multiplexing, since temporal multiplexing prevents Raman scattering of classical optical signals from interfering with the transmission of photonic qubits 580.

System 600 may further include a rotator 640 that multiplexes between the relaying of classical optical signals 682 and 684. Rotator 640 may be replaced by a wavelength-division multiplexer that allocates different wavelength bands to each of classical optical signals 682 and 684. Without departing from the scope hereof, the functionality of rotator (or wavelength-division multiplexer) 640 may be integrated into multiplexer 650. For example, multiplexer 650 may be a wavelength-division multiplexer that allocates three different wavelength bands to photonic qubits 580, classical optical signal 682, and classical optical signal 684, respectively.

Although not shown in FIG. 6, system 600 may further include computer 540.

One advantage of system 600 is that the same optical fiber of the optical access network is used for both the quantum channel and the classical channel, such that no dedicated quantum channel infrastructure is required.

Figure 7:
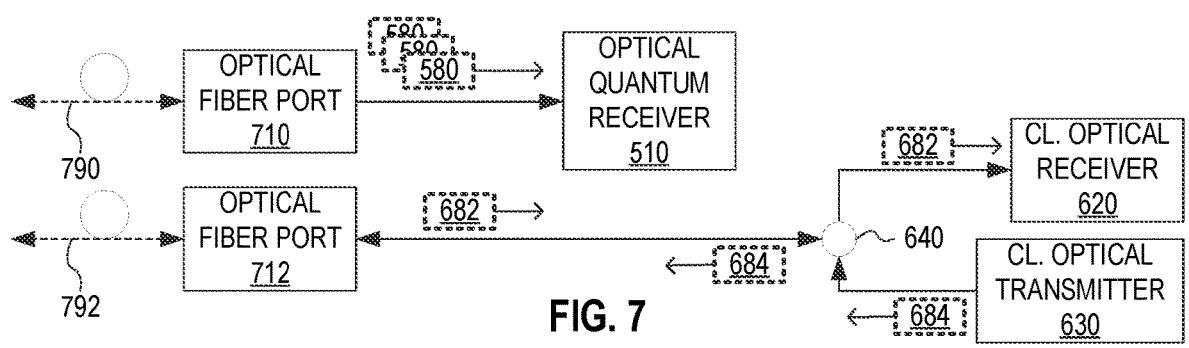
FIG. 7 illustrates another quantum-reception-enabled system for QKD-based encrypted optical data transmission, according to an embodiment.

FIG. 7 illustrates one quantum-reception-enabled system 700 for QKD-based encrypted optical data transmission. System 700 is an embodiment of system 500 specifically adapted for optical communication of classical signals and configured to utilize separate optical fiber connections for the quantum and classical channel connections to an optical access network. System 700 is similar to system 600 except for omitting multiplexer 650 and instead including one optical fiber port 710 communicatively coupled to optical quantum receiver 510, and another optical fiber port 712 communicatively coupled to classical optical receiver 620 and classical optical transmitter 630. System 700 is thus configured to utilize a dedicated optical fiber 790 for the quantum channel, while the classical channel is implemented over an optical fiber 792. Such use of a dedicated optical fiber for the quantum channel may reduce loss of photonic qubits 580 to noise or interference from classical optical signals 682 and 684.

Without departing from the scope hereof, either one of systems 600 and 700 may be implemented at central node unit 120 of a radio-access-based embodiment of network 100, wherein end node units 130 are communicatively coupled to central node unit 110 via radio access, and central node units 110 and 120 are communicatively coupled with each other via optical fiber.

Figure 8:
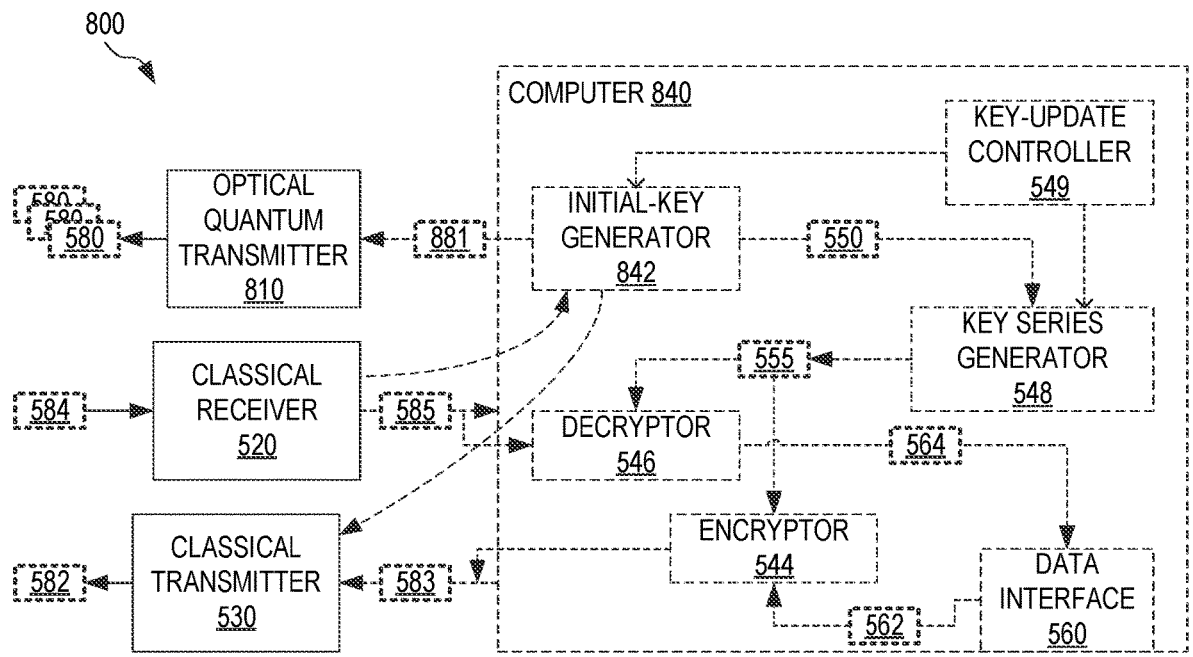
FIG. 8 illustrates a quantum-transmission-enabled system for QKD-based encrypted data transmission in an optical- or radio-access network having a plurality of end nodes, according to an embodiment.

FIG. 8 illustrates one quantum-transmission-enabled system 800 for QKD-based encrypted data transmission in an optical- or radio-access network having a plurality of end nodes. System 500 may be implemented in network 100 as an embodiment of either one of end node unit 130, central node unit 110, and central node unit 120. System 500 may be configured to perform certain embodiments of method 300 implementing step 314, for example according to protocol 200 or 400.

System 800 is similar to system 500 except for optical quantum transmitter 810 replacing optical quantum receiver 510 and optional computer 840 replacing optional computer 540. Computer 840 is similar computer 540 except for initial-key generator 842 replacing initial-key generator 542. Systems 500 and 800 may be implemented at opposite ends of optical quantum channels 170 and classical channels 172 in network 100, and cooperate with each other to perform protocol 200 or 400 (with system 800 positioned at node 210 and system 500 positioned at node 220).

Optical quantum transmitter 810 transmits a plurality of photonic qubits 580. Optical quantum transmitter 810 may include a weak laser light source for generation of photonic qubits 580. Optical quantum transmitter 810 may perform step 312 of method 300, or step 410 of protocol 400.

Initial-key generator 842 cooperates with initial-key generator 542, located at another node of the network, to establish initial key 550 according to a QKD protocol, for example as discussed below in reference to FIG. 12. Examples of suitable QKD protocols include BB84, E91, entangled photon pair, and measurement-device-independent twin-field QKD. Initial-key generator 842 may be configured to utilize classical receiver 520 and/or classical transmitter 530 to obtain and/or transmit classical data in the process of establishing initial key 550.

Figure 9:
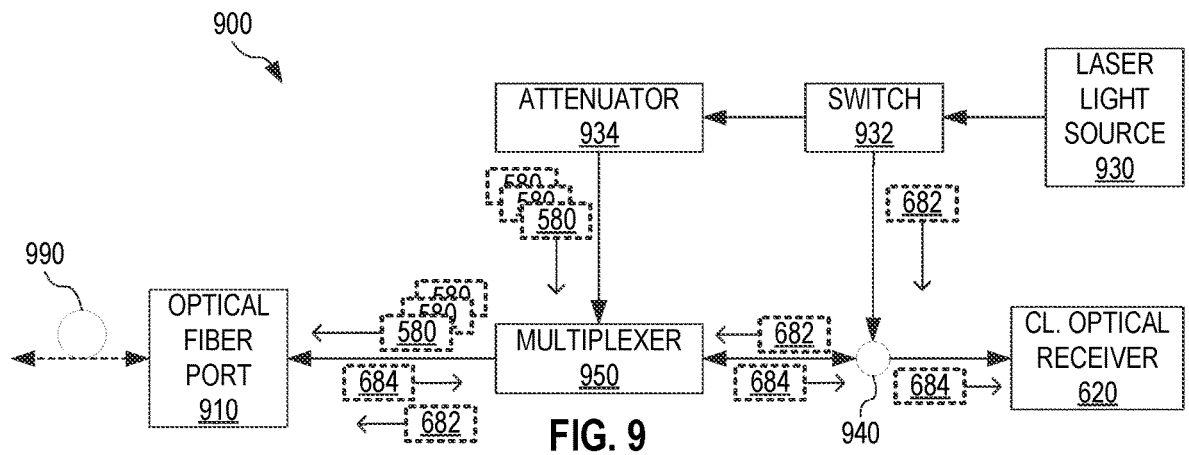
FIG. 9 illustrates a quantum-transmission-enabled system for QKD-based encrypted optical data transmission, according to an embodiment.

FIG. 9 illustrates one quantum-transmission-enabled system 900 for QKD-based encrypted optical data transmission. System 900 is an embodiment of system 800 specifically adapted for optical communication of classical signals and configured to (a) utilize a shared optical fiber connection for both quantum and classical channel connections to an optical access network, as well as (b) utilize a shared laser light source for generation of photonic qubits 580 and classical optical signal 682.

System 900 includes a laser light source 930, a switch 932, an attenuator 934, classical optical receiver 620, a multiplexer 950, and an optical fiber port 910. Laser light source 930 is an embodiment of classical transmitter 530. Laser light source 930 and attenuator 934 together form an embodiment of optical quantum transmitter 810. Switch 932 switches between (a) laser light source 930 being used for generation of classical optical signal 682 and (b) an output of laser light source 930 being directed to attenuator 934 for generation of photonic qubits 580. System 900 transmits photonic qubits 580 at optical fiber port 910 which, in operation, is coupled to an optical fiber 990 of the optical access network. System 900 also receives classical optical signals 684 from optical fiber port 610, and transmits classical optical signals 682 at optical fiber port 610.

Multiplexer 950 temporally or spectrally multiplexes between (a) relaying photonic qubits 580 from attenuator 934 to optical fiber port 910 and (b) relaying classical optical signals 684 to classical optical receiver 620 and classical optical signals 682 from laser light source 930. Thus, multiplexer 950 temporally or spectrally multiplexes between using optical fiber 990 as a quantum channel and a classical channel. Multiplexer 950 may be a switch for temporal multiplexing, or a wavelength-division multiplexer that allocates one wavelength band to the quantum channel and another wavelength band to the classical channel.

System 900 may further include a rotator 940 that multiplexes between the relaying of classical optical signals 682 and 684. Rotator 940 may be replaced by a wavelength-division multiplexer that allocates different wavelength bands to each of classical optical signals 682 and 684. Without departing from the scope hereof, the functionality of rotator (or wavelength-division multiplexer) 940 may be integrated into multiplexer 950. For example, multiplexer 950 may be a wavelength-division multiplexer that allocates three different wavelength bands to photonic qubits 580, classical optical signal 682, and classical optical signal 684, respectively.

Although not shown in FIG. 9, system 900 may further include computer 840.

One advantage of system 900 is that the same optical fiber of the optical access network is used for both the quantum channel and the classical channel, such that no dedicated quantum channel infrastructure is required.

Figure 10:
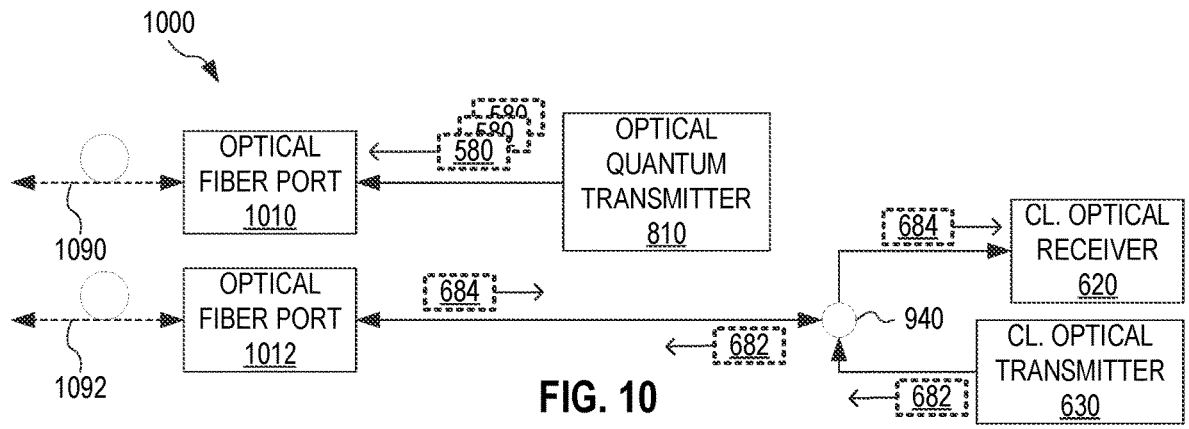
FIG. 10 illustrates another quantum-transmission-enabled system for QKD-based encrypted optical data transmission, according to an embodiment.

FIG. 10 illustrates another quantum-transmission-enabled system 1000 for QKD-based encrypted optical data transmission. System 1000 is an embodiment of system 800 specifically adapted for optical communication of classical signals and configured to utilize separate optical fiber connections and separate transmitters for the quantum and classical channels in an optical access network. System 1000 may function as a counterpart to system 700.

System 1000 includes optical quantum transmitter 810, classical optical receiver 620, classical optical transmitter 630, and optical fiber ports 1010 and 1012. Photonic qubits generated by optical quantum transmitter 810 are transmitted at optical fiber port 1010 to a quantum-channel-dedicated optical fiber 1090 of the network. Classical optical receiver 620 and classical optical transmitter 630 are communicatively coupled to optical fiber port 1012. In system 1000, classical optical transmitter 630 generates classical optical signals 682 which are transmitted at optical fiber port 1012 to another optical fiber 1092 of the network. System 1000 is further configured to receive classical optical signals 684 at optical fiber port 912, from optical fiber 1092, and direct classical optical signals 684 to classical optical receiver 620.

System 1000 may further include a rotator 940 for multiplexing between the relaying of classical optical signals 682 and 684, as discussed above in reference to FIG. 9. Although not shown in FIG. 10, system 1000 may further include computer 840.

Without departing from the scope hereof, either one of systems 900 and 1000 may be implemented at central node unit 120 of a radio-access-based embodiment of network 100, wherein end node units 130 are communicatively coupled to central node unit 110 via radio access, and central node units 110 and 120 are communicatively coupled with each other via optical fiber.

Figure 11:
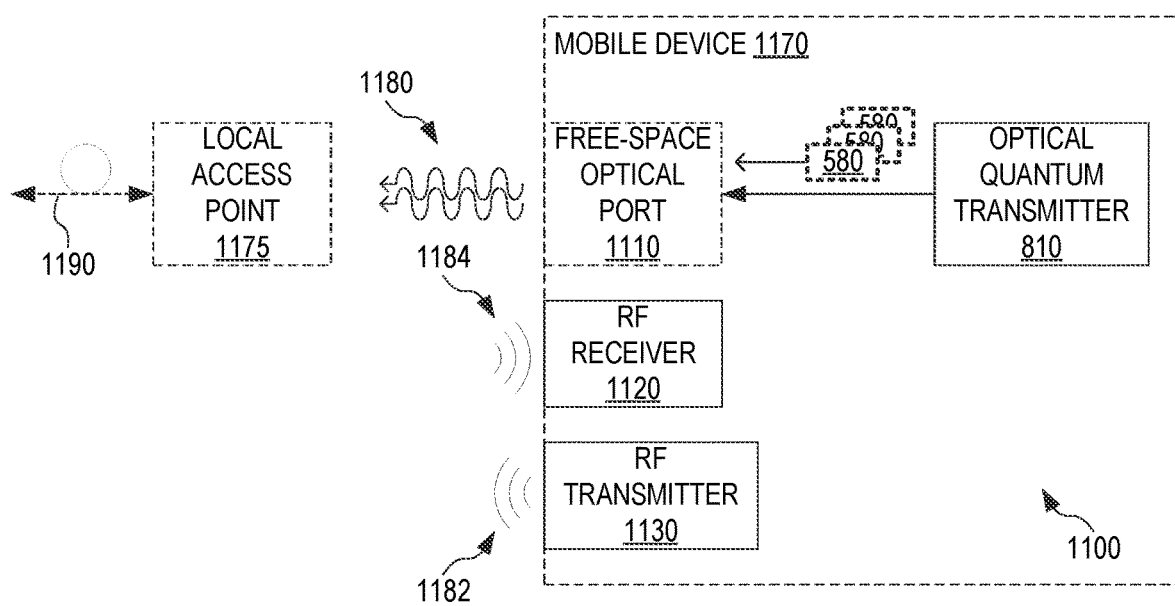
FIG. 11 illustrates a quantum-transmission-enabled system for QKD-based encrypted RF data transmission, according to an embodiment.

FIG. 11 illustrates one quantum-transmission-enabled system 1100 for QKD-based encrypted RF data transmission. System 1100 is an embodiment of system 800 specifically adapted for radio-access and configured to utilize free-space optical transmission of photonic qubits to a local access point of the network. System 1100 may be implemented in end node unit 130 of a radio-access network, or as a system configured for W-Fi connecting to an optical access network. System 1100 includes optical quantum transmitter 810, RF receiver 1120, RF transmitter 1130, and a free-space optical port 1110 (e.g., a window). RF transmitter 1130 transmits classical RF signals 1182 to the radio-access network, and RF receiver 1120 receives classical RF signals 1184 from the radio-access network. Free-space optical port 1110 transmits photonic qubits 580, generated by optical quantum transmitter 810, as a free-space optical signal 1180. RF receiver 1120 and transmitter 1130 are embodiments of classical receiver 520 and transmitter 530, respectively.

System 1100 may be implemented in a mobile device 1170, such as a smartphone or tablet computer. System 1100 may be configured to connect to a local access point 1175 that is coupled to the radio-access network via an optical fiber 1190. Local access point 1175 may be provided as a separate device, thus allowing a user of mobile device 1170 to occasionally place mobile device 1170 in free-space optical connection with local access point 1175 to carry out a transmission of free-space optical signal 1180 required to update initial key 550 via QKD. Local access point 1175 may be similar to a charging or docking station, and may be configured to place mobile device 1170 in such a manner as to properly aim free-space optical signal 1180 to local access point 1175.

Although not shown in FIG. 11, system 1100 may further include computer 840.

Since system 1100 may only be in occasional connection with local access point 1175, it may be advantageous to perform several instances of step 310 of method 300 when system 1100 and local access point 1175 are connected, to build a library of initial keys for use before it is once again possible or convenient to connect system 1100 to local access point 1175.

Figure 12:
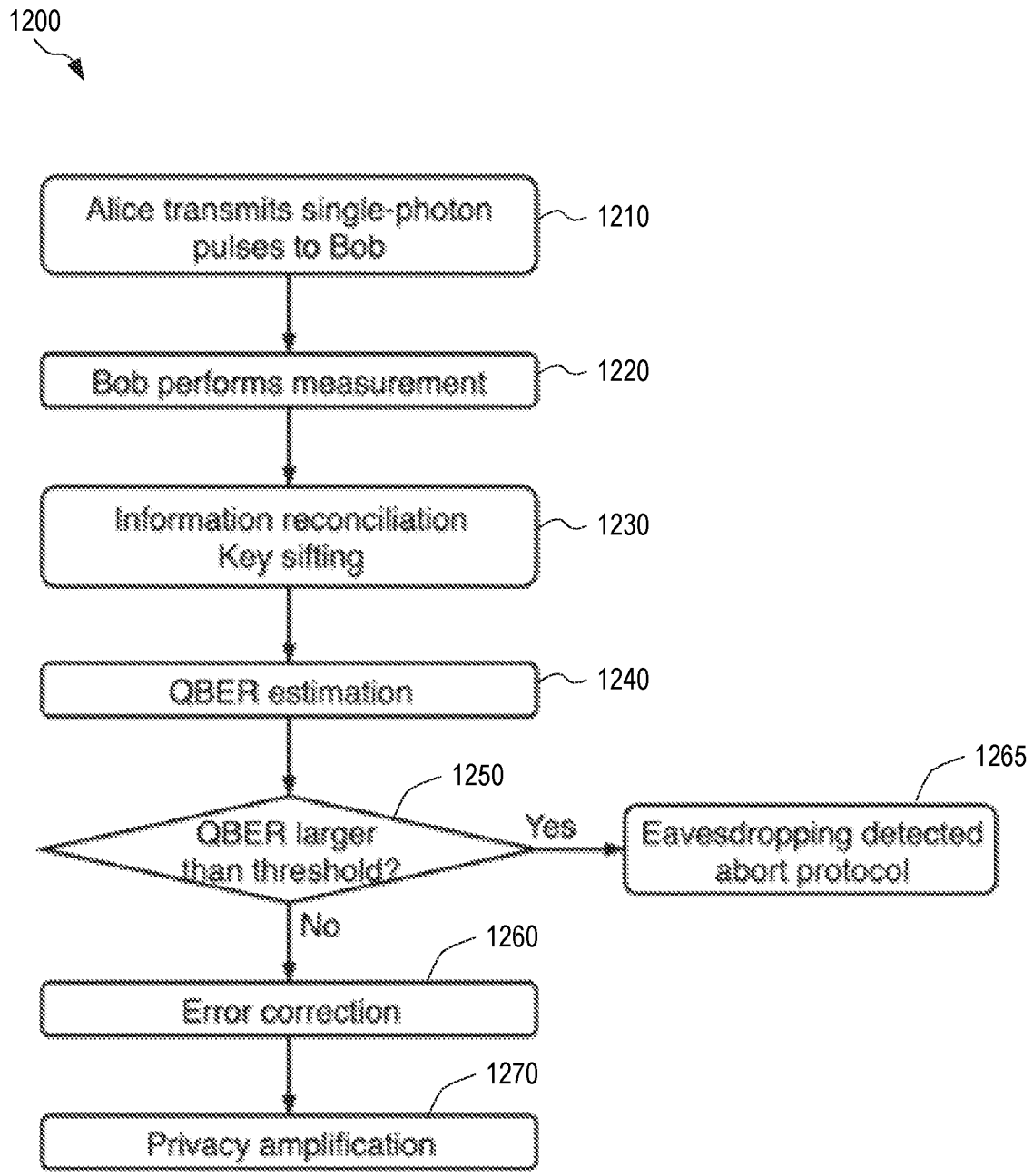
FIG. 12 is a flowchart for a protocol for QKD between two parties Alice and Bob, according to an embodiment.

FIG. 12 is a flowchart for one QKD protocol 1200 for QKD between two parties Alice and Bob. QKD protocol 1200 may be utilized by the systems and methods disclosed herein and discussed above in reference to FIGS. 1-11.

In a step 1210, Alice modulates qubits onto single photons and sends them to Bob via a one-way quantum channel. Once Bob receives and measures the photons in a step 1220, QKD protocol 1200 proceeds to information reconciliation in a step 1230. The remainder of QKD protocol 1200 is conducted over a classical channel. Here, Alice announces the bases she used for polarization or phase coding. Bob also discloses the bases he used for measurement. This discussion may be public. It only needs an authentic classical channel, but not necessarily confidential. Thus, the information exchanged between Alice and Bob in step 1230 is available to Eve (an eavesdropper), but she cannot modify the information. During the key sifting, Alice and Bob only keep those bits that are prepared and measured in the same basis, and discard the rest. After key sifting, Alice and Bob publicly compare a small subset of sifted key to estimate quantum BER (QBER) in a step 1240. These bits will be discarded since they have been publicly disclosed. If the QBER is larger than a certain threshold (see decision step 1250), eavesdropping is detected and QKD protocol 1200 proceeds to abortion of the protocol in step 1265.

Otherwise, QKD protocol 1200 proceeds to steps 1260 and 1270 of key distillation using post-processing techniques, including error correction and privacy amplification. Error correction eliminates the error bits and shortens the key. After error correction, Alice and Bob have identical copies of the key, but Eve may still have some information about the key. Then privacy amplification further shortens the key and reduces Eve's information to an arbitrarily low value. Privacy amplification may be repeated several times.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A first node for encrypted data transmission in a network, comprising:
   a quantum transmitter that transmits a plurality of qubits to a second node of the network;
   a classical transceiver that classically communicates with the second node; and
   an initial-key generator that cooperates with the second node to transmit an initial key to the second node via the quantum transmitter;
   a key-series generator that:
      encrypts a first unencrypted key of a series of unencrypted keys with the initial key to generate a first encrypted key of a series of encrypted keys; and
      encrypts each subsequent unencrypted key of the series of unencrypted keys with a preceding unencrypted key of the series of unencrypted keys to generate a subsequent encrypted key of the series of encrypted keys;
      wherein the series of encrypted keys are transmitted to the second node via the classical transceiver; and
   one or both of a decryptor and an encryptor, wherein:
      the decryptor decrypts, using a last unencrypted key of the series of unencrypted keys, encrypted data received from the second node via the classical transceiver; and
      the encryptor encrypts, using the last unencrypted key, unencrypted data to be transmitted to the second node via the classical transceiver.

2. The first node of claim 1, comprising both the decryptor and the encryptor.

3. The first node of claim 1, the quantum transmitter comprising a laser.

4. The first node of claim 1, the classical transceiver comprising:
   a classical receiver that receives data from the second node via a first communication channel; and
   a classical transmitter that transmits data to the second node via a second communication channel that is different from the first communication channel.

5. The first node of claim 1, wherein the series of unencrypted keys includes one or more of the initial key, a master key, and a session key.

6. The first node of claim 1, wherein the quantum transmitter transmits the plurality of qubits according to a quantum key distribution protocol.

7. The first node of claim 1, wherein the quantum transmitter and classical transceiver share a single laser.

8. The first node of claim 7, further comprising a switch, wherein:
   when the switch is in a first position, laser light emitted by the single laser is coupled into a first optical fiber to transmit the plurality of qubits to the second node; and
   when the switch is in a second position, the laser light emitted by the single laser is coupled into a second optical fiber to establish a classical communication channel with the second node.

9. The first node of claim 7, further comprising a switch, a wavelength-division multiplexer, and an optical directional coupler, wherein:
   when the switch is in a first position:
      a first wavelength component of the laser light is coupled through the switch and into the wavelength-division multiplexer; and
      the wavelength-division multiplexer couples the first wavelength component into an optical fiber to transmit the plurality of qubits to the second node; and
   when the switch is in a second position:
      a second wavelength component of the laser light is coupled through the switch and into the optical directional coupler; and
      the optical directional coupler couples the second wavelength component into the wavelength-division multiplexer to transmit classical data to the second node.

10. The first node of claim 9, further comprising an attenuator between the switch and the wavelength-division multiplexer, the attenuator attenuating the first wavelength component of the laser light.

11. The first node of claim 1, further comprising an optical fiber port that couples the quantum transmitter and classical transceiver to the network via a single optical fiber.

12. The first node of claim 11, further comprising a switch, wherein:
   the switch, in a first position, couples the quantum transmitter to the optical fiber port to transmit the plurality of qubits to the second node; and
   the switch, in a second position, couples the classical transceiver to the optical fiber port to establish a classical communication channel with the second node.

13. The first node of claim 12, the classical transceiver comprising a laser, a photodetector, and an optical directional coupler that (i) couples light received from the single optical fiber to the photodetector and (ii) couples light emitted by the laser to the single optical fiber.

14. The first node of claim 1, the classical transceiver including a radio-frequency transceiver that wirelessly communicates with the second node.

15. The first node of claim 14, the quantum transmitter including a free-space output port that couples the plurality of qubits to an optical access point of the network.

16. The first node of claim 14, being implemented in a smartphone or tablet computer.

17. The first node of claim 1, the network comprising an access network.

18. The first node of claim 17, the access network comprising one or both of an optical access network and a radio access network.

19. The first node of claim 17, the access network comprising a passive optical network.

20. The first node of claim 17, the access network comprising a hybrid fiber and coaxial network.

21. A first node of a network, comprising:
   a quantum transmitter that transmits, to a second node of the network, a plurality of qubits processable to derive therefrom an initial key;
   a classical transmitter that transmits, to the second node, an output signal having unencrypted qubit-measurement information encoded therein; and
   a classical receiver that (i) receives, from the second node, an input signal having encrypted transmission data encoded therein and (ii) decrypts the encrypted transmission data using the initial key.

22. The first node of claim 21, the quantum transmitter including a laser that transmits the plurality of qubits as a sequence of single-photon pulses.

23. The first node of claim 21, wherein:
   each of the input and output signals is an optical signal;
   the classical receiver is an optical receiver; and
   the classical transmitter is an optical transmitter.

24. The first node of claim 23, further comprising an optical-fiber port and an optical switch, wherein:
- the optical switch, in a first position, connects the optical-fiber port to one or both of the optical receiver and the optical transmitter; and
- the optical switch, in a second position, connects the optical-fiber port to the quantum transmitter.

25. The first node of claim 23, further comprising:
- a first optical-fiber port coupled to the quantum transmitter; and
- a second optical-fiber port coupled to the optical receiver and the optical transmitter.

26. A first node of a network, comprising:
- a quantum receiver that receives, from an second node of the network, a plurality of qubits processable to derive therefrom an initial key;
- a classical receiver that receives, from the second node, an input signal having unencrypted qubit-measurement information encoded therein; and
- a classical transmitter that (i) encrypts unencrypted transmission data using the initial key to obtain encrypted transmission data and (ii) transmits, to the second node, an output signal having the encrypted transmission data encoded therein.

27. The first node of claim 26, wherein:
- the plurality of qubits comprises a series of single-photon pulses; and
- the quantum receiver includes a single-photon detector that detects each of the series of single-photon pulses.

28. The first node of claim 26, further comprising a classical computer that:
- derives, based on (i) the unencrypted qubit-measurement information and (ii) measurements of the plurality of qubits performed by the quantum receiver, the initial key from the plurality of qubits; and
- encrypts the unencrypted transmission data using the initial key.

29. The first node of claim 26, wherein:
- each of the input and output signals is an optical signal;
- the classical receiver is an optical receiver; and
- the classical transmitter is an optical transmitter.

30. The first node of claim 29, further comprising and an optical-fiber port and an optical switch, wherein:
- the optical switch, in a first position, connects the optical-fiber port to one or both of the optical receiver and the optical transmitter; and
- the optical switch, in a second position, connects the optical-fiber port to the quantum transmitter.

31. The first node of claim 29, further comprising:
- a first optical-fiber port coupled to the quantum transmitter; and
- a second optical-fiber port coupled to the optical receiver and the optical transmitter.

* * * * *